Sept. 21, 1965     M. CASTAGNA     3,207,260
TRAILER STEP ASSEMBLY
Filed Nov. 12, 1963     2 Sheets-Sheet 1
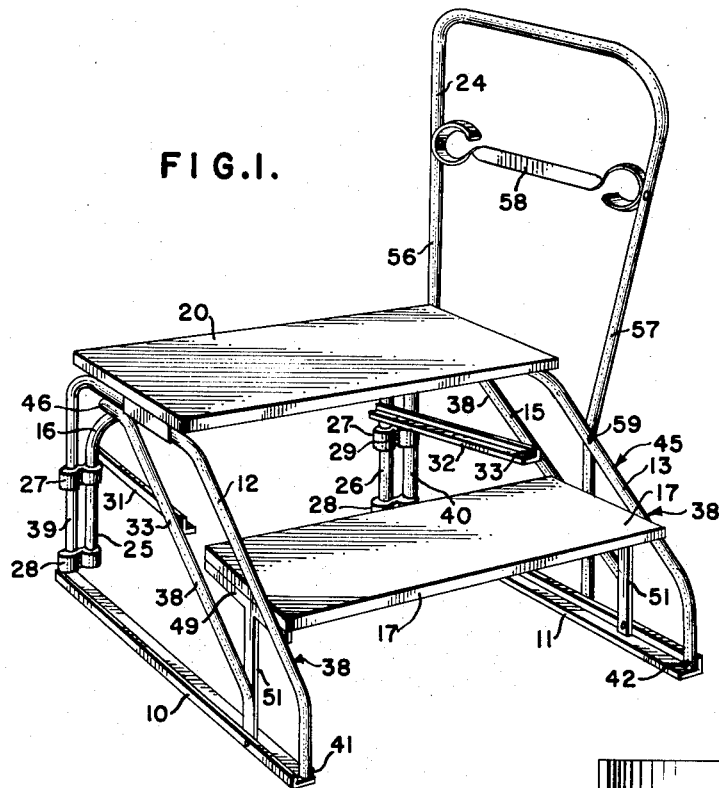
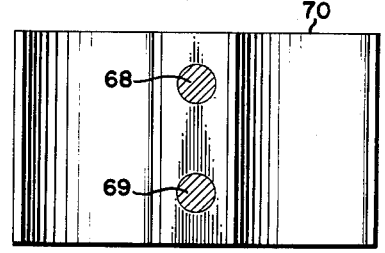
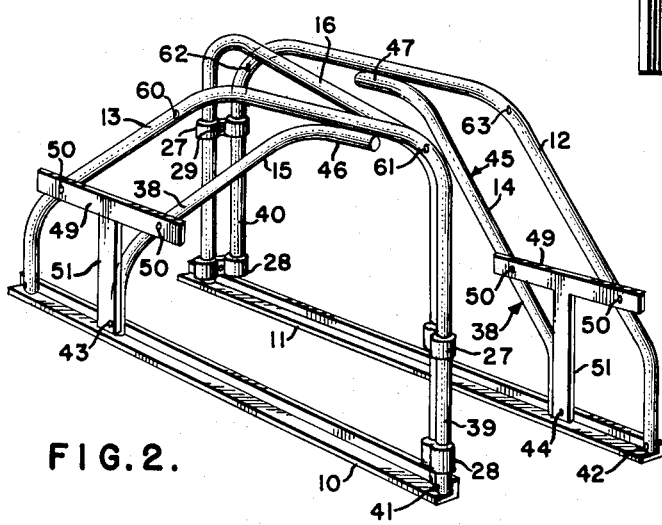
INVENTOR
MICHAEL CASTAGNA
BY
ATTORNEY Sept. 21, 1965  M. CASTAGNA  3,207,260
TRAILER STEP ASSEMBLY
Filed Nov. 12, 1963  2 Sheets-Sheet 2

INVENTOR
MICHAEL CASTAGNA
BY *James Harrison Bowen*
ATTORNEY

United States Patent Office 3,207,260
Patented Sept. 21, 1965

3,207,260
TRAILER STEP ASSEMBLY
Michael Castagna, Naples, Fla.
Filed Nov. 12, 1963, Ser. No. 324,166
3 Claims. (Cl. 182—106)

The present invention is a continuation-in-part of my pending application filed April 11, 1963, with the Serial No. 272,457, now abandoned, for a Trailer Step, in that the bearings or clamps providing swivel joints between the connector and end frames include bolts positioned between the legs of the connector and posts of the end frames, and furthermore, the said joints may be provided with a plurality of bolts instead of the single bolts shown in the pending case.

The present invention relates to portable steps for trailers, and in particular treads removably mounted in folding frames whereby the step assembly is readily set up for use, and is readily collapsed and folded for storage.

The purpose of this invention is to provide a collapsible step assembly for trailers in which the assembly is of comparatively light weight, and may readily be set up for use and also readily folded for storage, particularly in a vehicle.

Various types of collapsible steps have been provided for trailers, other vehicles, and for other purposes. However, where such steps are collapsible, they are of relatively heavy construction, and it is difficult for a woman, child, or the average layman, to remove the steps from storage, set up the steps for use, and also replace the steps in a storage space.

The object of this invention is, therefore, to provide means for constructing collapsible steps for trailers whereby the treads of the steps are supported by relatively light weight foldable frames.

Another object of the invention is to provide a step assembly for vehicles in which treads of steps are supported by frames of light weight tubular construction.

Another important object of the invention is to provide a collapsible step assembly in which the parts are assembled without screws, bolts, or other mechanical fastening elements, except as used in the swivel connecting elements.

It is yet another object of the invention to provide a hand rail for collapsible trailer steps in which the hand rail may be used at either end of the steps, and may or may not be used, as may be desired.

A further object of the invention is to provide a collapsible trailer step assembly in which there are no loose parts to become misplaced or lost.

A still further object of the invention is to provide a folding step assembly in which swivel connections between the parts are clamped in operative positions by bolts extended through elements thereof.

And a still further object of the invention is to provide a collapsible step assembly for trailers in which the assembly is of simple and economical construction.

With these and other objects and advantages in view the invention embodies a pair of end frames constructed of tubular material joined at the rear by an inverted U-shaped connector also of tubular material and connected to the end frames by swivel joints, and treads having depending flanges with slotted openings therein at the ends and positioned to receive studs of T-shaped supports on inner surfaces of the end frames.

Other features and advantages of the invention will appear from the following description taken in connection with the drawings, wherein:

FIGURE 1 is a perspective view of the trailer step showing the improved trailer step assembly of the present invention set up ready for use.

FIGURE 2 is also a perspective view of the trailer step assembly showing the assembly collapsed for storage, and in this view the treads are omitted.

FIGURE 7 is a longitudinal section through one of the clamps shown in FIGURE 6, taken on line 7—7 of FIGURE 6.

Figure 3:
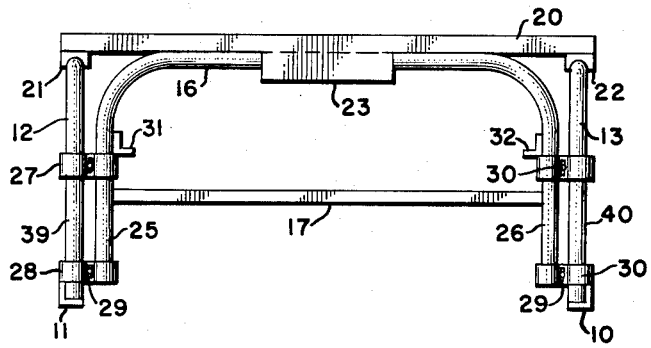
FIGURE 3 is a rear elevational view of the improved step assembly illustrating the construction of the supporting frames of the step assembly with the parts shown on a reduced scale.
Figure 4:
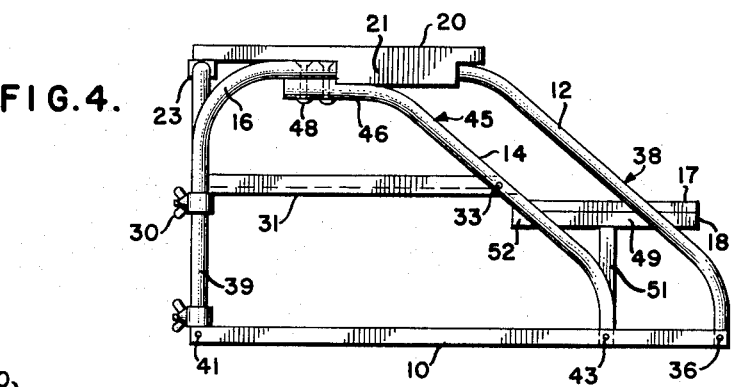
FIGURE 4 is an end elevational view of the improved trailer step assembly.

Referring now to the drawings wherein like reference characters denote corresponding parts the collapsible trailer step assembly of this invention includes a pair of end frames having angle bars 10 and 11 providing base members, outer stringers 12 and 13, the ends of which are connected to ends of the bars 10 and 11, inner stringers 14 and 15 connected to upper sections of the outer stringers, at one end, and at the opposite ends to the bars 10 and 11, an inverted U-shaped connector 16 pivotally connecting the end frames at the rear, a lower tread 17 having depending flanges 18 and 19 with slotted openings therein at the ends, and upper tread 20 having inverted U-shaped depending channel bars 21 and 22 at the ends, and 23 at the intermediate part, and a hand rail 24 designed to be attached to the frame at either end of the step assembly, and which may or may not be used as may be desired.

The connector 16 is provided with vertically disposed legs 25 and 26 on which upper clamps 27 and lower clamps 28 are positioned, and the clamps may be secured in position by set screws 29, or by bolts extended between the legs of the connector and posts of the end frames. The set screws or bolts may be provided with wing nuts 30. With the parts assembled in this manner the set screws or bolts are loosened when it is desired to collapse the step assembly, and one frame is turned completely around the other. The upper edges of the upper clamps 27 provide seats for rails 31 and 32, the opposite ends of which are attached by bolts 33 to the inner stringers 14 and 15. The rails 31 and 32 provide supports for a storage box or drawer 34, access to which is provided by swinging the upper tread 20 upwardly, as indicated by the dotted lines 35.

The forward ends of the outer stringers 12 and 13 are connected by bolts 36 and 37 to the forward ends of the angle bars or base rails 10 and 11, and from the bolts 36 and 37 the outer stringers extend upwardly and rearwardly, having inclined sections 38, and from upper ends of the inclined sections the stringers extend horizontally to upper ends of the posts 39 and 40. The lower ends of the posts 39 and 40 are connected by bolts 41 and 42 to the base rails 10 and 11.

The forward ends of the inner stringers 14 and 15 are connected to the base rails by bolts 43 and 44, and from the bolts the stringers extend upwardly and rearwardly having inclined sections 45, at the ends of which are horizontal ends 46 and 47 which are connected to the outer stringers by bolts 48.

Figure 5:
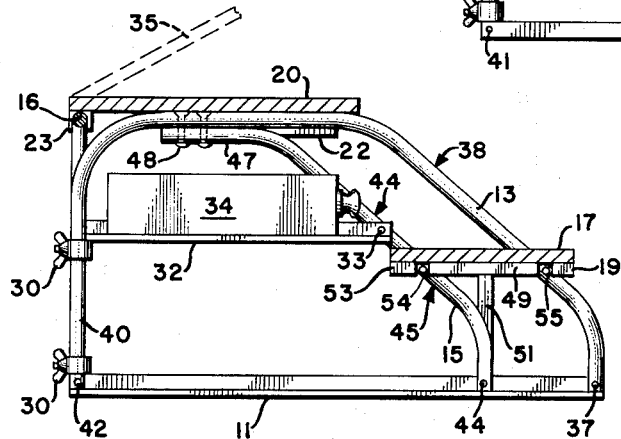
FIGURE 5 is a longitudinal section taken on line 5—5 of FIGURE 3, showing the relative positions of the parts of the trailer step assembly.

The treads are supported by T-shaped frames having cross bars 49, which are connected to the stringers by bolts 50, and vertical struts 51, which are connected to the base rails 10 and 11 by the bolts 43 and 44 of the inner stringers. The ends of the lower tread 17 are provided with depending flanges 52 and 53 which are provided with slots 54 and 55, and the slots 54 and 55 are positioned to receive the bolts 50 with the flanges 52 and 53 positioned between the cross bars 49 and stringers. The lower step or tread is retained in a horizontal position by the cross bars 49, and as shown in FIGURES 2 and 5, the cross bars 49 of the T-shaped frames take the load, providing supporting means for the treads. It will be understood that as many treads may be used as may be desired, depending upon the height of the trailer floor.

The treads, which may be made of any suitable material, are coated with fiberglass, or other material to prevent moisture working into the body of the treads. Although it is preferred to make the stringers and connector 16 of aluminum tubing, it will be understood that any suitable material may be used.

Figure 6:
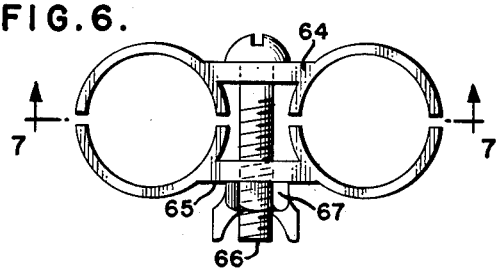
FIGURE 6 is an end elevational view illustrating one of clamps or swivel joints connecting the end frames to ends of the inverted U-shaped connector.

The clamps 27 and 28, as shown in FIGURES 1 through 5, are illustrated as extending around the vertical legs of the connector 16 and posts of the stringers, and the clamps are secured in position by set screws 29 on which wing nuts 30 are provided. In these figures inner ends of the set screws engage the legs 25 and 26 of the connector 16, or the posts 39 and 40 of the end frames. The bolts of the clamps may also extend between the legs of the connector and posts of the end frames, as shown in FIGURE 6.

The hand rail 24, which is provided with a vertically disposed post 56, an inclined post 57, and an intermediate cross member 58, is secured to either of the end frames by bolts 59, which may be inserted in bolt holes 60 and 61, at one side of the assembly, or in similar openings 62 and 63, at the opposite side.

The posts 39 and 40 of the end frames may also be connected to the legs 25 and 26 of the connector 16 by split clamps 64 and 65 which are urged against, or in clamping relation with the legs and posts by bolts 66 having wing nuts 67 thereon. The sections of the clamps may be retained in clamping relation with the legs and posts by single bolts, as shown in FIGURE 6, or by a plurality of bolts, such as the bolts 68 and 69, shown in FIGURE 7. The sections of the clamp shown in FIGURE 7 are indicated by the numeral 70.

The trailer step is collapsed by removing the treads and swinging one end frame completely around the other, as illustrated in FIGURE 2. The hand rail is removed before starting the swinging movement of the end frame. When it is desired to set up the step assembly for use one end frame is turned back or completely around the other, the frames being connected by swivel joints, and when the end frames are parallel or positioned normal to the connector 16 the treads are inserted, as shown and described, and the bind between the treads and frames provides a rigid step assembly.

The improved trailer step assembly provides a complete unit which is self-supporting and may be set up independent of a trailer, or the like, particularly as it stands upright on the runners or base angles 10 and 11, and does not require bolts, screws, braces, or other mechanical devices for assembly. The step assembly may be set up on any flat surface, and after being assembled, the completed unit may be moved into position for use at the door of a trailer or the like.

The new and useful combination of the split clamp units with one or two bolts extended through the clamp sections and between the connector legs and stringer posts, not only provides a hinge to facilitate collapsing the step assembly for storage, but also provides a lock for rigidly securing the connector and stringers in set up or open positions for use, and also in collapsed or closed positions for storage.

The advantage in making the step collapsible is that when moving from place to place, as is done with a trailer, it is folded and placed in an open space in the trailer in a few minutes.

From the foregoing description it is thought to be obvious that a trailer step assembly constructed in accordance with this invention is particularly well adapted for use by reason of the convenience and facility with which it may be assembled and used, and it will also be obvious that this invention is susceptible of some change and modification without departing from the principles and spirit thereof, and for this reason this specification is not desired to be understood as being limited to the precise arrangement and formation of the several parts herein shown in carrying out the invention in practice, except as claimed.

What is claimed is:
1. In a folding trailer step assembly, the combination which comprises
 (a) spaced parallel end frames including runners having upwardly extended and rearwardly inclined stringers mounted thereon and having posts at the rear connecting upper ends of the stringers to said runners,
 (b) an inverted U-shaped spacing and connector frame having vertically disposed legs parallel to and spaced from said posts of the end frames, the upper ends of said legs being connected by a transversely disposed rod,
 (c) clamps having substantially opposed semi-circular end formations extended around and clamped on said posts and legs by screws having wing nuts thereon providing swivel connections between said posts and legs,
 (d) an upper tread having pairs of depending parallel flanges on the ends and also on one side, said flanges being positioned to receive upper sections of the end frames and also the transversely disposed rod of said connector frame, said pairs of flanges constituting channel bars which retain the end frames and connector frame in operative positions,
 (e) a lower tread having slotted depending flanges at the ends,
 (f) T-shaped tread supports on inner surfaces of said end frames, mounted on said runners, and positioned to receive said slotted depending flanges of said lower tread, the rear end of one of said end frames being free to swing around the adjoining end of the other end frame, and to a position against the outer surface of said other end frame to facilitate storage and transportation.
2. In combination with a folding portable trailer step assembly as described in claim 1,
 (g) a hand rail, and means for mounting said hand rail selectively on either of said end frames of the trailer step assembly.
3. A folding portable trailer step assembly as described in claim 1, in which the parts are tubular.

References Cited by the Examiner

UNITED STATES PATENTS

| 2,282,689 | 5/42 | Ames | 297—6 |
| 2,821,762 | 2/58 | Foose | 24—81.3 |
| 2,907,402 | 10/59 | Lewis | 182—106 |
| 3,071,206 | 1/63 | Kristen | 182—152 |

FOREIGN PATENTS

| 791,282 | 2/58 | Great Britain. |

REINALDO P. MACHADO, *Primary Examiner.*